United States Patent
Pauchon et al.

(10) Patent No.: US 9,011,597 B2
(45) Date of Patent: Apr. 21, 2015

(54) METHOD FOR PREPARING A COMPOSITE MATERIAL FROM WASTE AND RESULTING MATERIAL

(75) Inventors: Véronique Pauchon, Venejan (FR); Pascal Antonucci, Meynes (FR); Nadège Cedat, Bagnols-sur-Ceze (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/574,236

(22) PCT Filed: Jan. 18, 2011

(86) PCT No.: PCT/EP2011/050634
§ 371 (c)(1),
(2), (4) Date: Oct. 10, 2012

(87) PCT Pub. No.: WO2011/089127
PCT Pub. Date: Jul. 28, 2011

(65) Prior Publication Data
US 2013/0061780 A1  Mar. 14, 2013

(30) Foreign Application Priority Data
Jan. 20, 2010  (FR) ..................... 10 50363

(51) Int. Cl.
*C04B 28/04* (2006.01)
*B29C 67/02* (2006.01)
*B09B 3/00* (2006.01)
*C02F 11/00* (2006.01)
(Continued)

(52) U.S. Cl.
CPC ............ *C04B 28/04* (2013.01); *C02F 11/008* (2013.01); *C04B 18/021* (2013.01); *C04B 28/06* (2013.01); *C04B 28/065* (2013.01); *C04B 2111/00405* (2013.01); *C04B 2111/00767* (2013.01)

(58) Field of Classification Search
CPC .... C04B 28/04; C04B 28/06; C04B 18/0436; C04B 11/008; B29C 67/02; B09B 3/00
USPC .................. 106/724, 745; 588/252, 256, 257; 264/117
See application file for complete search history.

(56) References Cited

U.S. PATENT DOCUMENTS 3,947,283 A * 3/1976 Uchikawa et al. ............ 106/692
3,980,558 A * 9/1976 Thompson .................... 588/252
(Continued)

FOREIGN PATENT DOCUMENTS

CH        660 876 A5     5/1987
CN       101050046 A     10/2007
(Continued)

OTHER PUBLICATIONS

International Search Report issued on Apr. 18, 2011 for International Application No. PCT/EP2011/050634.

*Primary Examiner* — Paul Marcantoni
(74) *Attorney, Agent, or Firm* — Knobbe, Martens, Olson & Bear, LLP

(57) ABSTRACT

A method for preparing a composite material from a waste appearing as sludge is provided. The method comprises a step consisting in putting said waste appearing as sludge in contact with a dry cement mixture. Also provided are the thereby obtained composite material and the use of such a method for treating and/or inertizing wastes and notably industrial and/or radioactive wastes.

19 Claims, 3 Drawing Sheets

(51) Int. Cl.
C04B 18/02 (2006.01)
C04B 28/06 (2006.01)
C04B 111/00 (2006.01)

(56) References Cited

U.S. PATENT DOCUMENTS

| | | | | |
|---|---|---|---|---|
| 4,113,504 A | * | 9/1978 | Chen et al. | 588/3 |
| 4,116,705 A | * | 9/1978 | Chappell | 588/257 |
| 4,304,674 A | * | 12/1981 | Lazovsky et al. | 588/257 |
| 4,338,134 A | * | 7/1982 | Graf zu Munster | 588/257 |
| 4,518,508 A | * | 5/1985 | Conner | 588/257 |
| 4,615,809 A | * | 10/1986 | King | 588/315 |
| 4,761,182 A | * | 8/1988 | Whitescarver et al. | 588/257 |
| 5,256,338 A | | 10/1993 | Nishi et al. | |
| 5,304,709 A | * | 4/1994 | Babcock et al. | 588/257 |
| 5,347,077 A | * | 9/1994 | Hooykaas et al. | 588/257 |
| 5,468,435 A | * | 11/1995 | Hancock, Jr. | 264/109 |
| 5,489,741 A | * | 2/1996 | Weszely | 588/257 |
| 5,640,704 A | | 6/1997 | Snyder et al. | |
| 7,128,780 B2 | * | 10/2006 | Matheson et al. | 106/697 |
| 8,123,854 B2 | * | 2/2012 | Cassat et al. | 106/694 |

FOREIGN PATENT DOCUMENTS

| | | |
|---|---|---|
| EP | 0 900 771 A1 | 3/1999 |
| JP | 2005 154522 A | 6/2005 |
| WO | 91/05586 A1 | 5/1991 |

* cited by examiner

METHOD FOR PREPARING A COMPOSITE MATERIAL FROM WASTE AND RESULTING MATERIAL

RELATED APPLICATIONS

This application is a U.S. National Phase of International Application No. PCT/EP2011/050634, filed Jan. 18, 2011, designating the U.S., and published in French as WO 2011/089127 on Jul. 28, 2011 which claims the benefit of French Patent Application No. 10 50363 filed Jan. 20, 2010.

TECHNICAL FIELD

The present invention relates to the field of processing wastes such as industrial and/or radioactive wastes notably appearing as sludges.

More particularly, the present invention relates to a method with which a composite material may be prepared from such wastes and they may be inertized by applying a dry cement material and by solidifying them, by coating them and/or by encapsulating them in the cement obtained.

The method according to the present invention thus gives the possibility of obtaining a composite material notably as granules comprising a cement matrix trapping wastes such as industrial and/or radioactive wastes. The present invention also relates to a composite material obtained according to the method of the present invention.

BACKGROUND

An industrial effluent treatment plant treats liquid effluents in order to reduce the polluting load of effluents before discarding them. This reduction is implemented by trapping mineral and organic pollutants by precipitation as insoluble compounds which, by coagulation-flocculation and decantation, form residual sludges.

French regulations impose inertization of ultimate hazardous industrial wastes before their storage in a storage center of class 1. Inertization of these wastes designates their stabilization and their solidification. Stabilization allows reduction in the solubility of the pollutants by their transformation into a form not very mobilizable by the environment. Solidification allows improvement in the physical and mechanical properties of the waste, and facilitates its handling and its storage.

Also, plants for treating radioactive liquid effluents have the role of collecting, storing and treating radioactive aqueous effluents. The treatment uses a co-precipitation method for decontaminating the effluents. Treatment by co-precipitation allows the radio-elements to be trapped by adsorption or by ion exchanges in precipitates of different natures. Decontamination of the radio-elements is carried out by using adsorbents. Some of them, such as ferrous and copper hydroxides or barium sulfate, are generated in situ, in the effluent to be decontaminated. Other ones are preformed, such as mixed nickel and potassium ferocyannide (ppFeNi) used for trapping cesium.

After precipitation and adsorption reactions, the suspension undergoes an operation for flocculation and for solid-liquid separation by decantation. After decantation, a fraction of the decontaminated supernatant is drained off to be discharged, the remainder being drained off towards the solid-liquid separation operation by filtration. Solid-liquid separation is achieved for example on a rotary filter with a filtering medium. It produces a decontaminated filtrate and <<ultimate waste>> sludges which are then conditioned.

Cementation is one of the techniques allowing inertization of wastes, notably of industrial and/or radioactive wastes appearing as sludges.

More particularly, the cementation of sludges conventionally consists in carrying out kneading (sludge+hydraulic cement) and then of casting the obtained mixture into a container. The good quality of the kneading for obtaining a homogeneous mixture at a macroscopic level as well as the possibility of casting the entirety of the coated material are inescapable conditions for using such a method.

Inertization in a cement matrix however has difficulties inherent to the physico-chemistry of the sludges to be treated. Indeed, suspensions of metal hydroxides in the case of iron for example have non-Newtonian rheological behavior characterized by flow behavior characterized by high flow threshold stress and high plastic viscosity.

Under certain conditions, suspensions of iron hydroxides have a structure of the gel type and a strong increase in the flow parameters is observed. This structure of the gel type is the limiting case of concentrated suspensions, in which all the liquid of the dispersing phase is trapped in structural units of the suspension which here are precipitate aggregates. The formation of a structure of the gel type from a suspension may be accomplished at rest in several days or much more rapidly, during the flowing of the suspension. The solid concentration, the salt content and the applied shearing to the suspension are the parameters which influence rheology in the first order. During cementation of sludges of metal hydroxides, the water contained in the sludge is bound to the solid and is not available for ensuring suitable rheology of the slurry. The rheological (flow) behavior of the mixture depends on the rheological behavior of the sludge. Cementation of this type of waste requires the use of a high water/cement (W/C) mass ratio in order to obtain the desired workability or consistency. Now, increasing the W/C ratio increases porosity, reduces mechanical strengths, which may thus no longer attain the required compression threshold (typically 8 MPa), without forgetting a significant reduction in the incorporation level.

Further, during the cementation of wastes, many chemical species contained in the sludges may precipitate and cause rapid stiffening of the mixture or flash setting in the kneader, phenomena which are also potentially redhibitory.

Therefore there exists a real need for proposing a method which is easy to apply and allowing inertization of the wastes and notably of industrial and/or radioactive wastes advantageously appearing as sludges.

DESCRIPTION OF CERTAIN INVENTIVE ASPECTS

The present invention gives the possibility of finding a remedy to the drawbacks and technical problems listed above.

Indeed, the work of the inventors allowed them to develop a new cementation method, in a <<semi-homogeneous>> mode, different from the conventional approach which is based on obtaining a homogeneous and fluid mixture. In the method according to the present invention, the waste is solidified in the kneader in the presence of a dry cement mixture, which allows extemporaneous preparation of a cement from the water contained in the waste. With this method, it is possible to stabilize and solidify the sludges, the chemistry of which causes instantaneous solidification or too high rheology in the kneader in the presence of cement.

The main advantage of the method according to the present invention is to cement and to develop sludges which are impossible to mix conventionally in cementation either because of their rheology (sludges in the form of a gel), or because of their physical or chemical characteristics which lead to solidification in the kneader.

The method according to the present invention is prepared from wastes as sludges and from the dry cement mixture i.e. without providing any additional water and, more particularly, the method according to the present invention only implements (applies) wastes in the form of sludges and a dry cement mixture. This stabilization of sludges without providing any additional water therefore allows maximization of the incorporation level of dry sludge material into the final composite or monolithic material and minimization of the hydrogen source term since there is no free water in the cement matrix. This operation may be carried out with all dry cement mixtures.

The method according to the present invention allows inertization of the co-precipitation sludges upon exiting from the filter, i.e. in the solid state, which avoids redissolution of the sludge in water and therefore the increase in volume of the waste.

Finally, the method according to the present invention allows solidification and stabilization of the sludges by using optimal formulation parameters and a material is thereby obtained for which the physical and chemical characteristics are maximum. In particular, the hydrogen source term is potentially reduced since there is no free water in the matrix. The method according to the present invention also allows insertion of a physical barrier limiting exchanges between the wastes and their environment and notably limiting the release of radionuclides (RN).

Therefore, the present invention relates to a method for preparing a composite material exclusively from a waste appearing as a sludge and from a dry cement mixture, comprising a step consisting in putting said waste appearing as sludge in contact with a dry cement mixture. The method according to the present invention only implements (applies) a waste appearing as sludge and a dry cement mixture, without adding any other additives during any of the steps of the method.

By <<composite material>>, is meant within the scope of the present invention, an assembly of a cement matrix and of wastes. This assembly may appear as an intimate mixture between the wastes and the cement matrix, as an encapsulation of the wastes by the cement matrix and/or as a coating of the wastes with the cement matrix. The composite material according to the present invention only contains wastes and a cement matrix.

The terms of <<monolith>> and <<composite material>>, in the present invention have similar meanings and may be used interchangeably.

It should be noted that the composite material according to the present invention cannot be pumped.

By <<dry cement mixture>>, is meant within the scope of the present invention, a mixture of finely milled materials giving in the presence of water a plastic mixture capable of setting and of hardening over time so as to provide a hydraulic cement matrix which appears as a solid and porous material in the dry condition. The hardening of the cement matrix is the result of the hydration of the finely milled materials of the dry cement mixture.

Within the scope of the present invention, the water required for this hydration is exclusively provided by the wastes appearing as sludges. Indeed, the method according to the present invention is applied without providing any additional water.

The dry cement mixture in totality or in part consists of a finely milled clinker. By <<clinker>>, is meant a mixture comprising one or several elements selected from the group consisting of:
limestone,
limestone having a CaO content varying between 50 and 60%,
a source of alumina such as ordinary bauxite or red bauxite, clay, and
a source of sulfate such as gypsum, calcium sulfate hemihydrate, plaster, natural anhydrite or sulfocalcium ashes,
said element(s) being crushed, homogenized and brought to a high temperature above 1,200° C., notably above 1,300° C., in particular of the order of 1,450° C. By <<of the order of 1,450° C.>>, is meant a temperature of 1,450° C.±100° C., advantageously a temperature of 1,450° C.±50° C. The high temperature calcination step is called <<clinkerization>>. After preparation of the clinker and before or during its milling, at least one other additive like a sulfate source as defined earlier, may be added to it.

Any dry cement mixture producing, after hydration, a hydraulic cement matrix, may be used within the scope of the present invention. As non-limiting examples, the dry cement mixture applied within the scope of the present invention is selected from the group consisting of a Portland Cement such as CEM I 52.5N Calcia Beaucaire HRC, a composite Portland Cement such as CEM 2 52.5N Tercem Lafarge La malle, an aluminous cement mixture, a sulfo-aluminous cement mixture, a ferro-aluminous cement mixture and mixtures thereof.

Thus, the dry cement mixture applied within the scope of the invention may be a Portland Cement or a composite Portland Cement. A Portland Cement advantageously comprises between 50 and 70% of tricalcium silicate $[(CaO)_3SiO_2]$, between 10 and 25% of dicalcium silicate $[(CaO)_2SiO_2]$, between 5 and 15% of tricalcium aluminate $[(CaO)_3Al_2O_3]$, between 5 and 10% of tetracalcium aluminoferrite $[(CaO)_4Al_2O_3Fe_2O_3]$. Such a Portland Cement may be mixed with secondary compounds in order to produce a <<composite Portland Cement>> in which the amount of secondary compounds such as blast furnace slags, silica fume, pozzolan, fly ashes, calcined shale or limestone, is greater than 3% notably comprised between 5 and 80%, in particular comprised between 10 and 60% by weight based on the total weight of said composite Portland Cement.

Alternatively, the dry cement mixture applied within the scope of the invention may be an aluminous cement mixture, i.e. the clinker of which in majority comprises calcium aluminates.

Still alternatively, the dry cement mixture applied within the scope of the invention may also be a sulfo-aluminous or ferro-aluminous cement mixture. Patent application EP 0 900 771 notably describes cement mixtures based on sulfo-aluminous and ferro-aluminous clinkers. These clinkers are cement binders with rapid hardening properties and obtained by clinkerization at a temperature varying between 1,200 and 1350° C. of mixtures containing at least one source of lime such as limestones having a CaO content varying between 50 and 60%, at least one source of alumina and at least one source of sulfate as defined earlier. Advantageously, a sulfo-aluminous clinker comprises between 28 and 40% of $Al_2O_3$, between 3 and 10% of $SiO_2$, between 36 and 43% of CaO, between 1 and 3% of $Fe_2O_3$, and between 8 and 15% of $SO_3$. A ferro-aluminous clinker, as for it, comprises between 25 and 30% of $Al_2O_3$, between 6 and 12% of $SiO_2$, between 36 and 43% of CaO, between 5 and 12% of $Fe_2O_3$, and between 5 and 10% of $SO_3$.

Any dry cement mixture is characterized by its specific surface area. The latter expressed in cm²/g corresponds to the surface area developed per unit mass. Therefore it allows characterization of the fineness of the milling: the finer the milling of the dry cement mixture, the larger is its specific surface area. The specific surface area is measured by means of Blaine's test, a so-called air permeability test, according to the Arcy-Kozeny relationship, which establishes that the crossing of a bed of granules by a fluid is affected by the specific surface area of these granules.

The specific surface area of the dry cement mixture applied within the scope of the present invention may be measured on a Blaine permeabilimeter such as the Blaine BSA1 instrument from Acmel Society (Champlan, France) or via a BET measurement according to the Brunauer, Emett and Teller method.

Advantageously, the dry cement mixture applied within the scope of the present invention has a specific surface area comprised between 3,000 and 7,000 cm²/g, notably between 3,500 and 7,000 cm²/g and, in particular between 4,000 and 7,000 cm²/g.

By <<waste appearing as sludge>>, is meant, within the scope of the present invention, waste selected from the group consisting of sludge stemming from the treatment of waste waters, sludge stemming from the treatment of industrial liquid effluents, sludge stemming from the treatment of radioactive liquid effluents, sludge stemming from silo bottoms and mixture thereof. In fact, the waste as a sludge applied within the scope of the present invention may belong to one or several types of the sludges listed earlier. Advantageously, the waste as a sludge applied within the scope of the present invention is a sludge stemming from the treatment of industrial and/or radioactive liquid effluents. The waste as a sludge is advantageously a residual or residuary waste as defined in the field of waste treatment.

The waste as a sludge applied within the scope of the present invention may contain one or several elements from non-toxic carbonaceous compounds, toxic pollutants, corrosive elements, radioactive components, heavy metals and inorganic compounds. As non-limiting examples, these elements are selected from the group consisting of metal hydroxides, metal oxides, carbonates, mixed nickel and potassium ferrocyanide, chlorine, fluorine, sulfur, zinc, phosphorus, mercury, lead, cadmium, arsenic, phenol, cyanides, ferrocyanides, oxalates, silicates, humic acids, strontium, ruthenium, cesium, α-emitters, such as americium, plutonium and uranium and mixtures thereof. The waste as a sludge applied within the scope of the present invention mainly contains metal hydroxides.

The composition of the waste as a sludge will not only depend on the origin of the initial liquid effluent but also on the treatment used for preparing a sludge from this effluent (decantation, filtration, coagulation, flocculation, co-precipitation, adsorption and other physico-chemical treatments, etc.).

A sludge is defined as a suspension or a dispersion of solid elements in a liquid. The waste as a sludge applied within the scope of the present invention may therefore appear in different forms and this depending on the amount of liquid which it contains. Thus, the waste may be a solid sludge, a slurry sludge, a powdery sludge or a liquid sludge. Advantageously, the waste applied within the scope of the present invention appears as a solid sludge or a slurry sludge.

The dryness of a sludge characterizes the dry material mass % based on the total sludge mass. Thus, the following equation may be defined:

$$Dryness = dry\ material\ \% = 100 - water\ \%.$$

The dryness of the sludge may be obtained experimentally on a sludge sample for which homogeneity is guaranteed by stirring. A taking of a certain amount of this sample of the order of about one hundred grams is placed on a dry plate. The whole (plate+taken sample) is weighed: $M_0$ represents the obtained mass. The plate and the taken sample are then placed in an oven heated to a temperature greater than or equal to 105° C. for drying the sample. Drying is continued until the mass of the whole (plate+dried sample) is constant. This constant mass is designated as $M_1$. The dryness of the analyzed sludge sample is therefore calculated according to the formula:

$$Dryness = 100 * M_1/M_o$$

Advantageously, the waste as a sludge applied within the scope of the present invention has a dryness comprised between 10 and 85%, notably between 10 and 75%, in particular between 15 and 75% and more particularly between 20 and 65%.

If the waste as a sludge applied within the scope of the method according to the invention does not have sufficient dryness, it may, before applying the method, be subject to any treatment known to one skilled in the art by which the amount of liquid may be reduced in a sludge. As non-limiting examples, mention may be made of drying notably by natural evaporation, thermal drying, draining, centrifugation, filtration, dehydration notably on a filter press with membranes or strip filter, etc.

In the method according to the present invention, the mass ratio between the waste as a sludge (mass expressed in g) and the applied dry cement mixture (mass expressed in g) is advantageously comprised between 0.1 and 1.2; notably between 0.2 and 1.1; in particular between 0.3 and 1 and more particularly between 0.4 and 0.95.

In the method according to the present invention, the W/C mass ratio with W representing the mass of water in the waste as a sludge (expressed in g) and C representing the mass of the dry cement mixture (expressed in g) used is advantageously comprised between 0.2 and 0.7 and notably between 0.3 and 0.6. More advantageously, the W/C ratio is of the order of 0.4 (i.e. 0.4±0.1) in order to limit residual water in the composite material. As a reminder, the mass of water in the W/C ratio corresponds to the mass of water in the waste as a sludge since no additional provision of water is applied within the scope of the method according to the invention.

Depending on the characteristics of the applied waste as a sludge and notably depending on the dryness of this sludge, one skilled in the art will be able to select an adapted dry cement mixture without any inventive effort notably on the basis of the fact that, advantageously:
- the lower the dryness of the waste as a sludge, more the selected dry cement mixture has to have a high specific surface area;
- the greater the dryness of the waste as a sludge, the smaller is the amount of the dry cement mixture used and the more is increased the incorporation level of sludge dry material into the monolithic material.

Thus, the dry cement mixture is notably selected depending on its chemistry, on its water demand and on its specific surface area which has to be as high as possible.

The method for preparing a composite material from waste as a sludge according to the present invention advantageously comprises the steps:

a) putting said waste as a sludge into contact with a dry cement mixture, b) mixing said waste as a sludge and the dry cement mixture in order to obtain a composite material;

c) optionally compacting the composite material obtained in step (b).

Steps (a) and (b) of the method according to the present invention are advantageously applied in a kneader. Any kneader known to one skilled in the art may be used within the scope of the present invention. As non-limiting examples, mention may be made of a NAUTA® mixer, a HOBART® kneader and a HENSCHEL® kneader.

More particularly, the step for putting the waste as a sludge in contact with the dry cement mixture (step (a)) consists in sprinkling the dry cement mixture on the waste as a sludge introduced beforehand into a kneader.

The action of <<sprinkling>> or <<flouring>> the waste appearing as sludge with the dry cement mixture dries the surface and allows the mixture to be broken up.

During the kneading in step (b) of the method, the water initially present in the waste appearing as sludge is entirely used for hydrating the dry cement mixture. The method according to the present invention therefore applies <<chemical drying of the sludge>> which leads to the formation of a capsule of cement around the salts, whence a lower sensitivity to the chemical composition of the sludge. This barrier is chemically stabilized, encapsulation of the sludge is thereby achieved.

The kneading during the step (b) of the method according to the invention, of the waste mixture as a sludge and dry cement mixture is accomplished at a relatively slow speed, just like the kneading of the waste as a sludge before applying the method according to the invention. By <<relatively slow speed>>, is meant, within the scope of the present invention, a speed of rotation of the rotor of the kneader of less than 300 rpm, notably less than 200 rpm, in particular less than 100 rpm, more particularly comprised between 5 and 70 rpm. As a non-limiting example, in the case of a standardized kneader, the stirring rate is 140 rpm and the planetary gear speed is 62 rpm.

The composite material obtained following step (b) of the method according to the present invention advantageously appears as granules or pellets. The thereby obtained granules or pellets have a granular range extending from 2 μm to 15 mm, notably from 5 μm to 10 mm and in particular from 10 μm to 3 mm.

As the method according to the present invention is carried out in quasi-dry conditions, the cleaning of the kneader is facilitated. The material recovery level is greater as compared with a conventional cementation method since the obtained granules do not have the adhesive nature of the highly viscous homogeneous mixtures. The use of a scraper gives the possibility of limiting the retentions in the kneader. The volumes of rinsing effluents are notably reduced and these effluents are further not very loaded with suspended material.

The obtained composite material following step (b) of the method according to the invention may be compacted (step (c)) notably by cold pelletization. This optional compaction step is advantageously applied manually or by any means capable, by applying pressure, of transforming or reducing the obtained granules following step (b) of the method into a more compact solid form such as a monolith, a pellet, a block or a layer. Such a means is notably a hydraulic press, a waste compactor, a compacting press or a vibratory compacting plate. The method according to the invention thus gives the possibility of obtaining a stable, homogeneous composite material having high mechanical compression strength.

In an advantageous alternative of step (c) of the method according to the invention, the compacting may be directly achieved in the storage barrel.

The applied pressure should be sufficient in order to obtain a monolithic solid, but not too high in order to preserve the water required for the reactions for hydrating the cement and which ensure the cohesion of the composite material. Advantageously, during the compacting step (c), the pressure applied to the material obtained following step (b) is less than 150 MPa, notably less than 150 MPa and in particular comprised between 5 and 90 MPa.

The steps (a), (b) and (c) of the method according to the present invention are advantageously applied at a temperature comprised between 4 and 40° C., notably between 10 and 30° C. and, in particular, at room temperature. By <<room temperature>> is meant a temperature of the order of 20° C. (i.e. 20° C.±5° C.)

The present invention also relates to a method for treating and/or inertizing wastes consisting in preparing a composite material from said wastes according to a method as defined earlier.

By <<treatment and/or inertization of waste>>, is meant, within the scope of the present invention solidification and stabilization of said waste into a solid material having reduced permeability to water and a reduced leachable fraction and improved mechanical strength as compared with the initial waste.

The present invention finally relates to a composite material which may be prepared by a method as defined earlier.

The composite material according to the present invention is the obtained material either following step (b) of the method, or following step (c) of the method as defined earlier. Therefore, the composite material according to the invention may appear either as granules or round pellets, or in a more compact form such as a monolith, a tablet, a block or a layer.

The method according to the present invention is a method which does not require any provision of additional water. Therefore, the method according to the invention allows solidification and stabilization of the wastes as sludges in quasi <<dry>> conditions leading to an optimized conditioning matrix in terms of the incorporation level of the waste. The dry material incorporation level of the waste as a sludge in the final composite material is therefore maximized relatively to the materials of the prior art.

The mass incorporation level of dry material (Ti) into the composite material obtained following the method according to the present invention is calculated according to the following formula:

$$Ti=100*[M_S/(M_B+M_C)]$$

with $M_S$ representing the dry material mass of the waste as a sludge (expressed in g), $M_B$ representing the mass of the waste as a sludge (expressed in g) and $M_C$ representing the mass of the dry cement mixture (expressed in g).

Advantageously, the mass incorporation level of dry material (Ti) in the obtained composite material following the method according to the present invention is greater than 5, notably greater than 10, in particular, greater than 15 and more particularly, greater than 20.

Other features and advantages of the present invention will become further apparent to one skilled in the art upon reading the examples given below as an illustration but not as a limitation, with reference to the appended figures.

DETAILED DISCUSSION OF CERTAIN ILLUSTRATIVE EMBODIMENTS

I. The Method According to Certain Illustrative Embodiments of the Invention The sludge is first introduced into the kneader, the mobile rotating at a low speed. For a standardized laboratory kneader, the stirring rate is 140 rpm. The cement sludge is then sprinkled until pellets are obtained.

Figure 1A:
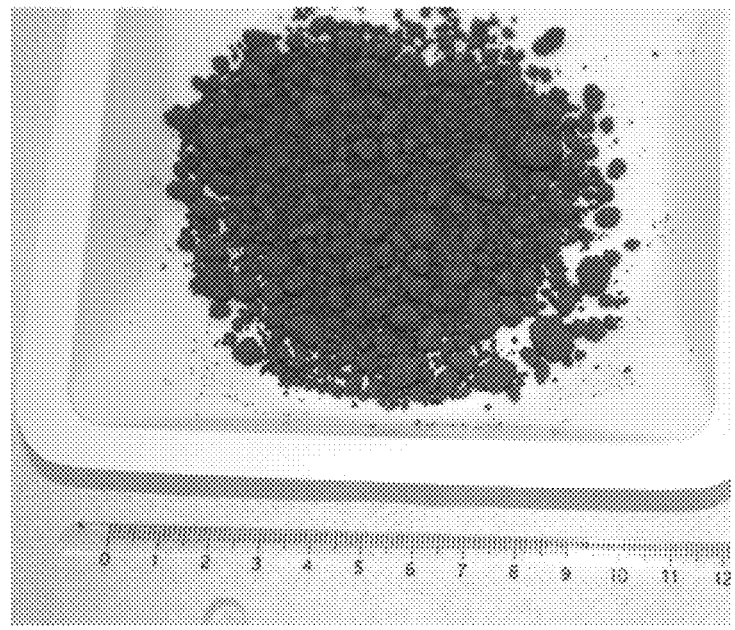
FIG. 1 is a photograph showing the aspect and the dimensions of the granules obtained by the method according to the present invention before (FIG. 1A) and after setting of the cement (FIG. 1B).
Figure 1B:
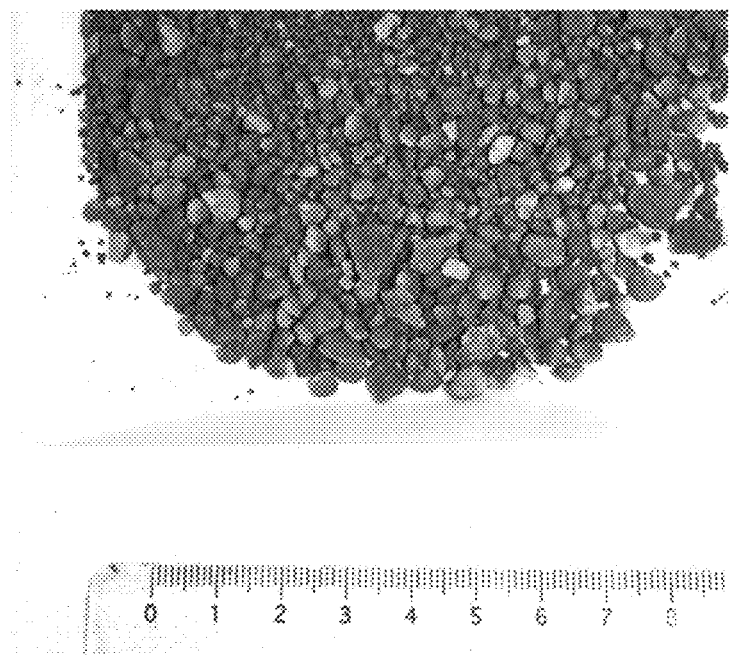

FIG. 1 shows the aspect and the dimensions of the granules obtained before (FIG. 1A) and after (FIG. 1B) setting of the cement. The dimension of the granules depends on the speed of rotation of the kneader. Thus, by using a greater speed of rotation (285 rpm on a standardized laboratory kneader), it is possible to break up the composite material and obtain a smaller average diameter of the granules.

Figure 2:
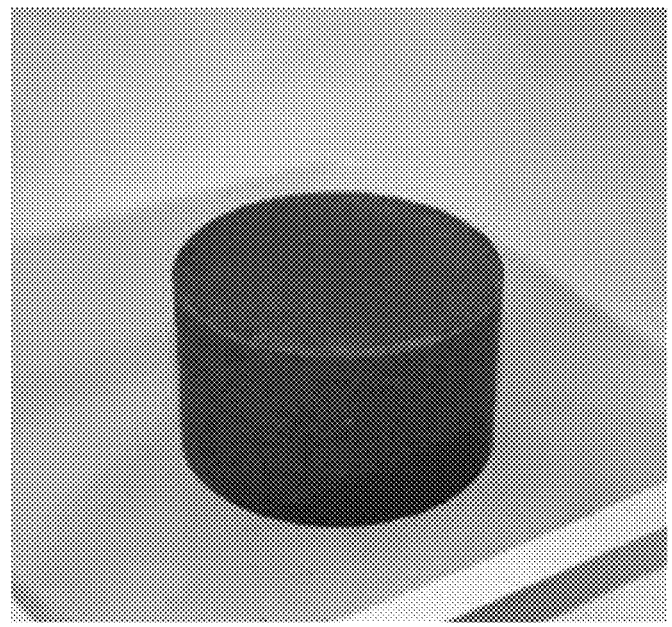
FIG. 2 is a photograph of a pellet of about 90 cm$^3$ (a diameter of 57 mm and a height of 36 to 38 mm) notably obtained by compacting the sludge+cement mixture applied according to the method of the present invention.

The obtained particles are humid and malleable and may therefore be compacted by means of a press. The particles are poured into a container, in which they will be compacted. FIG. 2 shows the pellet obtained after cold pelletization with a hydraulic press (7.5 MPa<P<15.2 MPa) corresponding to 2 T in the present case.

Figure 3:
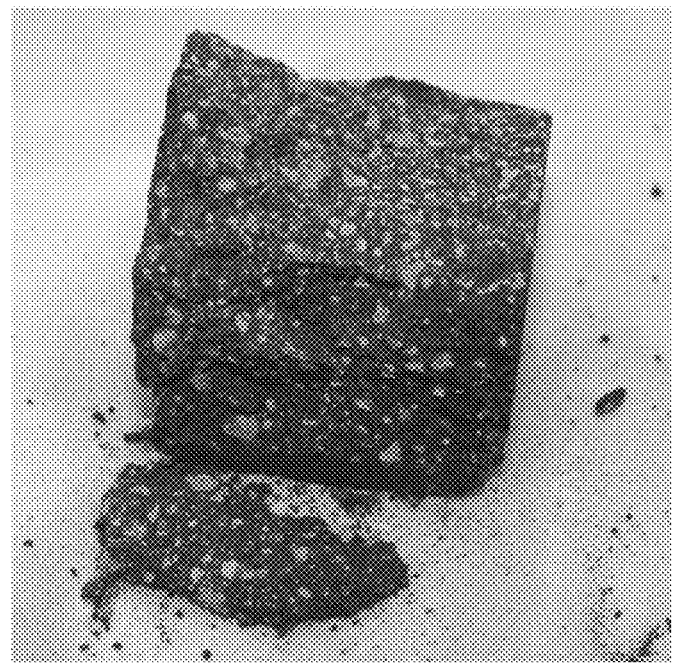
FIG. 3 is a photograph showing the internal aspect of a tablet obtained by the method according to the present invention.

The encapsulation phenomenon of the sludge obtained within the scope of the method according to the present invention is visible in FIG. 3 which shows the inside of the pellet.

Figure 4:
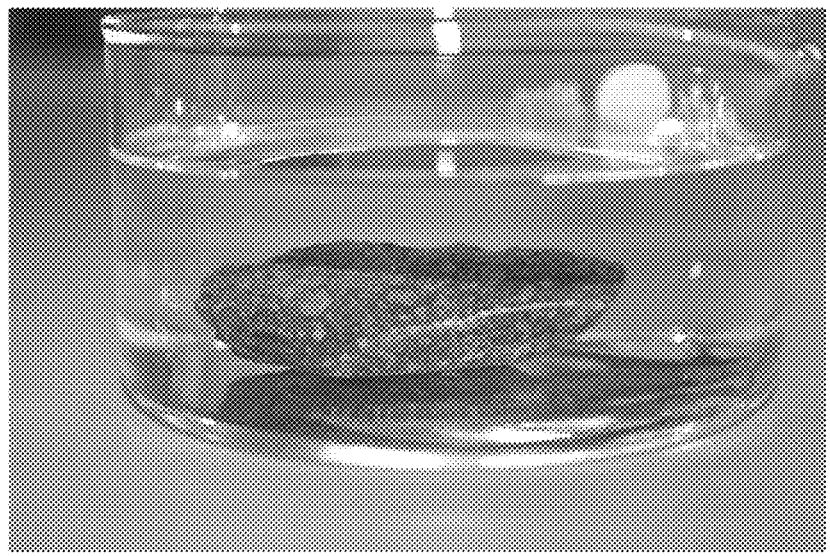
FIG. 4 is a photograph showing a fragment of a pellet obtained by the method according to the present invention, immersed in demineralized water (after 90 days).

The encapsulated sludge in the cement in accordance with the method according to the present invention, is chemically stabilized. Indeed, when a pellet is introduced into water or a pellet fragment into water (for 90 days), no degradation is observed (FIG. 4).

Figure 5:
FIG. 5 is a photograph showing solid sludge which may be applied within the scope of the present invention, the dry extract of which is 37.7%.

II. Sludges and Cements Applied in the Method According to Certain Illustrative Embodiments of the Invention The sludge is advantageously filtered before being in a solid or very pasty form (FIG. 5) and in order to have dryness as great as possible so as to increase the dry material level.

Table 1 hereafter groups the characteristics of the sludges and cements used.

TABLE 1

Physico-chemical characteristics of the sludges and cements used

| Sludge | Chemical composition | Dry extract | Cement | Blaine surface |
|---|---|---|---|---|
| A | Fe(OH)$_2$ Fe(OH)$_3$ Cu(OH)$_2$ | 22.4% | CEM 1 52.5N Calcia Beaucaire HRC | 4270 |
| A | BaSO$_4$ PPFeNi | 35.94% | CEM 1 52.5N Calcia Beaucaire HRC | 4270 |
| B | | 37.67% | CEM 1 52.5N Calcia Beaucaire HRC | 4270 |
| B | | 40.72% | CEM 1 52.5N Calcia Beaucaire HRC | 4270 |
| B | | 34.49% | CEM 2 52.5N Tercem Lafarge la Malle | 6250 |
| C | 48% CaCO$_3$ | 56.6% | CEM 1 52.5N Calcia Beaucaire HRC | 4270 |

The sludge mass is introduced into the kneader. The mobile rotating at a low speed, the sludge is then sprinkled with cement until pellets are obtained. The action of <<flouring>> the solid sludge with cement dries the surface and allows the mixture to be broken up.

The sludge and cement masses used for the different tests are grouped in Table 2.

The mixture is then compacted manually or with a hydraulic press. The pressures typically applied are indicated in Table 2.

TABLE 2

Masses of sludge and cement used, characteristics of the mixture.

| | Sludge | | | | | | Characteristics of the pellet | |
|---|---|---|---|---|---|---|---|---|
| Sludge | Introduced mass (g) | Dry material mass (g) | Water mass contained in the sludge (g) | Cement Introduced mass (g) | Pressure (N/m$^2$) | W/C | Sludge mass incorporation level | Dry material mass incorporation level |
| A | 150.6 | 33.75 | 116.85 | 382 | | 0.31 | 28 | 6.3 |
| A | | | | 458.7 | manual | 0.25 | 24.7 | 5.5 |
| A | 100 | 35.95 | 64.06 | 160 | 0.16 | 0.4 | 38.5 | 13.8 |
| B | 85 | 32 | 53 | 132.5 | 0.16 | 0.4 | 39.1 | 14.7 |
| B | 83 | 33.8 | 49.2 | 123 | 0.08 | 0.4 | 40.3 | 16.4 |
| B | 85 | 29.3 | 55.7 | 97.35 | 0.08 | 0.57 | 46.6 | 16.1 |
| C | 100 | 56.6 | 43.4 | 108.5 | 0.08 | 0.4 | 48 | 27 |

III. Properties of Tablets Obtained by the Method According to Certain Illustrative Embodiments of the Invention The obtained tablets are then kept at 20° C. The four hardening conditions used are in air, in a sealed bag, under water or in a weathering enclosure with 95% humidity. The pellets do not show any degradation or cracking at different lapses of storage time and for different storage conditions. The mechanical compression strength of the different tablets are grouped in Table 3 hereafter.

TABLE 3

Storage conditions and mechanical compression strength of the tablets.

| Test | W/C | Dry material mass incorporation level | Storage conditions | Storage time (days) | Compression strength (MPa) |
|---|---|---|---|---|---|
| 2 | 0.25 | 5.5 | 20° C./95% humidity | 7 | 84 |
| 3 | 0.4 | 13.8 | 20° C./95% humidity | 7 | 13 |
| 4 | 0.4 | 14.7 | 20° C./Under water | 90 | 30 |
| 5 | 0.4 | 16.4 | 20° C./In air | 28 | 9 |
| 6 | 0.57 | 16.1 | 20° C./Sealed bag | 30 | 30 |
| 7 | 0.4 | 27 | 20° C./Under water | 38 | 23 |

What is claimed is:

1. A method for preparing a composite material from a starting material consisting of sludge waste and from a dry cement mixture, the method comprising:
putting into contact, without adding water, the sludge waste and the dry cement mixture and mixing the sludge waste and the dry cement mixture whereby a composite material which cannot be pumped is obtained,
wherein no other additives are added during any of the steps of the method,
wherein the sludge waste has a dryness between 20 and 65%;
a mass ratio between the sludge waste (mass expressed in g) and the dry cement mixture (mass expressed in g) is between 0.3 and 1; and
wherein the dry cement mixture is selected from the group consisting of:
(i) Portland Cement;
(ii) Composite Portland Cement consisting of Portland Cement and one or more ingredients selected from the group consisting of blast furnace slags, silica fume, pozzolan, fly ashes, calcined shale and limestone;
(iii) aluminous cement mixture having a clinker consisting of greater than 50% calcium aluminates and the remainder being one or more ingredients selected from the group consisting of calcium silicates, tetracalcium aluminunoferrite, $Al_2O_3$, $SiO_2$, CaO, $Fe_2O_3$ and $SO_3$;
(iv) sulfo-aluminous cement mixture having a clinker consisting of between 28 and 40% of $Al_2O_3$, between 3 and 10% of $SiO_2$, between 36 and 43% of CaO, between 1 and 3% of $Fe_2O_3$, and between 8 and 15% of $SO_3$;
(v) ferro-aluminous cement mixture having a clinker consisting of between 25 and 30% of $Al_2O_3$, between 6 and 12% of $SiO_2$, between 36 and 43% of CaO, between 5 and 12% of $Fe_2O_3$, and between 5 and 10% of $SO_3$; and
(vi) mixtures of two or more of (i) through (v).

2. The method according to claim 1, wherein the dry cement mixture is selected from the group consisting of Portland Cement, composite Portland Cement, aluminous cement mixture, sulfo-aluminous cement mixture, ferro-aluminous cement mixture and mixtures thereof.

3. The method according to claim 1, wherein the dry cement mixture has a specific surface area comprised between 3,000 and 7,000 $cm^2/g$.

4. The method according to claim 1, wherein the dry cement mixture has a specific surface area comprised between 3,500 and 7,000 $cm^2/g$.

5. The method according to claim 1, wherein the dry cement mixture has a specific surface area comprised between 4,000 and 7,000 $cm^2/g$.

6. The method according to claim 1, wherein the sludge waste is selected from the group consisting of sludge stemming from the treatment of waste waters, sludge stemming from the treatment of industrial liquid effluents, sludge stemming from the treatment of radioactive liquid effluents, sludge stemming from bottoms of silos and mixtures thereof.

7. The method according to claim 1, wherein the sludge waste appears as a solid sludge or as a slurry sludge.

8. The method according to claim 1, wherein the mass ratio between the waste as a sludge (mass expressed in g) and the dry cement mixture (mass expressed in g) is between 0.4 and 0.95.

9. The method according to claim 1, wherein the W/C mass ratio with W representing the mass of water in the waste as a sludge (expressed in g) and C representing the mass of dry cement mixture (expressed in g) is between 0.2 and 0.7.

10. The method according to claim 1, wherein the W/C mass ratio with W representing the mass of water in the waste as a sludge (expressed in g) and C representing the mass of dry cement mixture (expressed in g) is between 0.3 and 0.6.

11. The method according to claim 1, wherein the W/C mass ratio with W representing the mass of water in the waste as a sludge (expressed in g) and C representing the mass of dry cement mixture (expressed in g) has the value 0.4±0.1.

12. The method according to claim 1, wherein the method further comprises:
mixing the waste as a sludge and the dry cement mixture to obtain a composite material; and
optionally compacting the composite material obtained in the mixing.

13. The method according to claim 1, wherein the putting the sludge waste in contact with the dry cement mixture consists of sprinkling the dry cement mixture on the sludge waste introduced beforehand into a kneader.

14. The method according to claim 12, wherein the composite material obtained following the mixing comprises particles having a particle size range extending from 2 µm to 15 mm.

15. The method according to claim 12, wherein the composite material obtained following the mixing comprises as particles having a particle size range extending from 5 µm to 10 mm.

16. The method according to claim 12, wherein the composite material obtained following the mixing comprises as particles having a particle size range extending from 10 µm to 3 mm.

17. A method for treating and/or inertizing wastes comprising preparing a composite material from the wastes according to a method as defined in claim 1.

18. The method according to claim 12, wherein the composite material obtained following the mixing comprises granules.

19. The method according to claim 12, wherein the composite material obtained following the mixing comprises pellets.

\* \* \* \* \*